US012639886B2

(12) United States Patent (10) Patent No.: US 12,639,886 B2
Casella et al. (45) Date of Patent: May 26, 2026

(54) CONTENT PLAYBACK AND MODIFICATIONS IN A 3D ENVIRONMENT

(71) Applicant: APPLE INC., Cupertino, CA (US)

(72) Inventors: Tyler L. Casella, Martinez, CA (US); Yi Zhou, Sunnyvale, CA (US); Maneli Noorkami, Menlo Park, CA (US); David J. Addey, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 155 days.

(21) Appl. No.: 18/120,636

(22) Filed: Mar. 13, 2023

(65) Prior Publication Data

US 2023/0290042 A1 Sep. 14, 2023

Related U.S. Application Data

(63) Continuation of application No. PCT/US2021/045346, filed on Aug. 10, 2021.
(Continued)

(51) Int. Cl.
*G06T 15/20* (2011.01)
*G11B 27/031* (2006.01)
(52) U.S. Cl.
CPC ............ *G06T 15/20* (2013.01); *G11B 27/031* (2013.01)
(58) Field of Classification Search
None
See application file for complete search history.

(56) References Cited

U.S. PATENT DOCUMENTS 9,310,883 B2 4/2016 Weising et al.
9,473,758 B1 10/2016 Long et al.
(Continued)

FOREIGN PATENT DOCUMENTS

CN 101002253 A 7/2007
CN 110809149 A 2/2020
(Continued)

OTHER PUBLICATIONS

Kojima et al. Hand manipulation of virtual objects in wearable augmented reality, Proceedings Seventh International Conference on Virtual Systems and Multimedia (2001, pp. 463-469) (Year: 2001).*
(Continued)

*Primary Examiner* — Kee M Tung
*Assistant Examiner* — Biao Chen
(74) *Attorney, Agent, or Firm* — Thompson Hine LLP

(57) ABSTRACT
Various implementations disclosed herein include devices, systems, and methods that presents playback of application content within a three-dimensional (3D) environment. An exemplary process presents a first set of views that includes application content provided by the application within a 3D environment. The first set of views are provided from a first set of viewpoints during execution of the application. The process records of the execution of the application based on recording program state information and changes to the application content that are determined based on user inter-actions, and presents a second set of views including a playback of the application content within the 3D environ-ment based on the recording. The second set of views are provided from a second set of viewpoints that are different than the first set of viewpoints.

18 Claims, 6 Drawing Sheets

200

Related U.S. Application Data

(60) Provisional application No. 63/077,775, filed on Sep. 14, 2020.

(56) References Cited

U.S. PATENT DOCUMENTS

| | | | |
|---|---|---|---|
| 10,551,993 B1 | 2/2020 | Sanocki et al. | |
| 2017/0087464 A1 | 3/2017 | Perry et al. | |
| 2017/0269685 A1 | 9/2017 | Marks et al. | |
| 2018/0276004 A1* | 9/2018 | Bache | G06F 3/04886 |
| 2020/0043237 A1* | 2/2020 | Desai | G06F 3/0346 |
| 2020/0233681 A1 | 7/2020 | Garstnauer et al. | |

FOREIGN PATENT DOCUMENTS

| | | | |
|---|---|---|---|
| CN | 111052045 A | 4/2020 |
| EP | 3608756 A1 | 2/2020 |
| WO | 2020/005898 A1 | 2/2020 |

OTHER PUBLICATIONS (PCT) European Patent Office (ISA/EP), International Search Report and Written Opinion of the International Searching Authority, International Application No. PCT/US2021/045346, 11 pages, Nov. 26, 2021.
European Patent Office, Communication Pursuant to Article 94(3) EPC, European Patent Application No. 21765771.7, 9 pages, Dec. 18, 2025.
China National Intellectual Property Administration, First Office Action issued in Chinese Patent Application No. 202180076652.1 dated Feb. 2, 2026 with English translation (29 pages).

\* cited by examiner

200

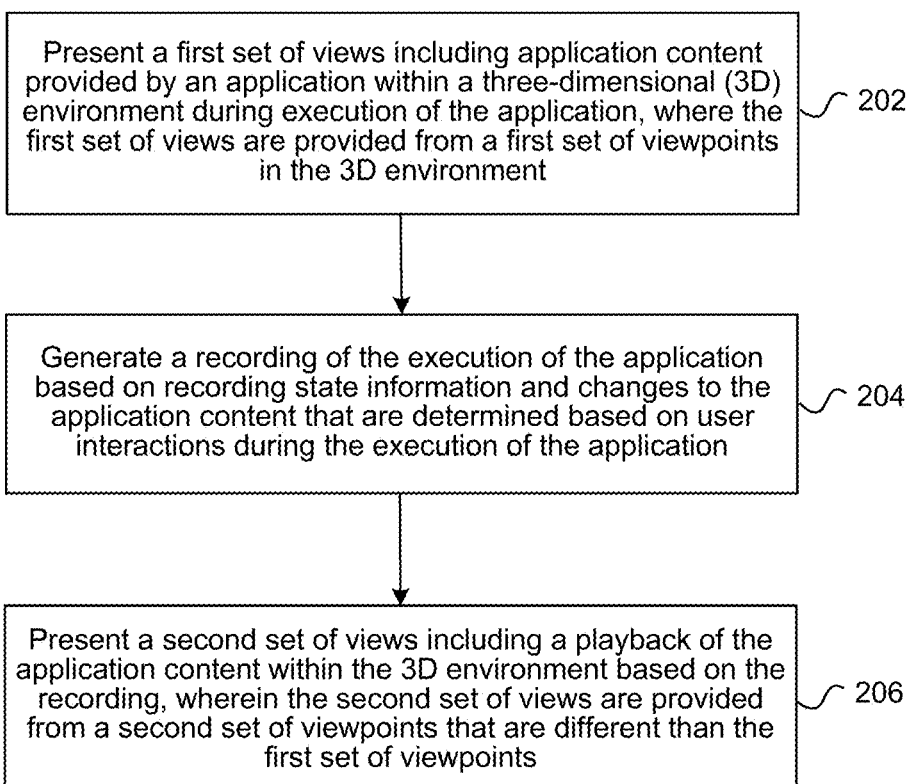

Present a first set of views including application content provided by an application within a three-dimensional (3D) environment during execution of the application, where the first set of views are provided from a first set of viewpoints in the 3D environment ⟋ 202

Generate a recording of the execution of the application based on recording state information and changes to the application content that are determined based on user interactions during the execution of the application ⟋ 204

Present a second set of views including a playback of the application content within the 3D environment based on the recording, wherein the second set of views are provided from a second set of viewpoints that are different than the first set of viewpoints ⟋ 206

FIG. 2

CONTENT PLAYBACK AND MODIFICATIONS IN A 3D ENVIRONMENT

CROSS-REFERENCE TO RELATED APPLICATIONS

This patent application is a continuation of International Application No. PCT/US2021/045346 filed Aug. 10, 2021, which claims the benefit of U.S. Provisional Application No. 63/077,775 filed Sep. 14, 2020, both entitled "CONTENT PLAYBACK AND MODIFICATIONS IN A 3D ENVIRONMENT," each of which is incorporated herein by this reference in its entirety.

TECHNICAL FIELD

The present disclosure generally relates to systems, methods, and devices for presenting views of application content in a three-dimensional (3D) environment on an electronic device, and in particular, to providing views that include a playback of the application content within the 3D environment.

BACKGROUND

An electronic device may present a 3D environment that includes content provided by an application. For example, an electronic device may provide a view that includes application content within an environment that includes a three-dimensional (3D) representation of a user's living room. The appearance of the user's living room may be provided via an optical see-through technique, a pass-through video technique, based on a 3D reconstruction, etc. Developing and debugging application content for use in 3D environments can be time consuming and difficult. Existing techniques may not make it easy to detect, review, and correct undesirable application activity and other issues. For example, identifying and resolving unexpected behavior by the application, such as a physics engine that causes a virtual object to move unexpectedly, may involve an undesirable amount of testing and retesting of the application.

SUMMARY

Various implementations disclosed herein include devices, systems, and methods for recording and playing back the use/testing of an application that provides content in a three-dimensional (3D) environment (e.g., computer-generated reality (CGR)) based on recording program states, parameter values, changes, and the like for debugging purposes within the 3D environment. For example, a developer can use a device (e.g., a head-mounted device (HMD)) to test an application and, in the test, roll a virtual bowling ball into virtual bowling pins and then rewind a recording of the test to observe why one of the pins did not respond as expected. In an exemplary use case in which an application interacts/synchronizes changes with a system application, the recording may involve grabbing/reusing those changes and writing them to a video file, i.e., a video file that records scene content snapshots and changes that may have occurred therein. Additionally, the system may reconstruct sound (e.g., spatialized audio), and other details of the application for playback and review (e.g., full snapshots of the application).

In general, one innovative aspect of the subject matter described in this specification can be embodied in methods that include the actions of during execution of an application, presenting a first set of views including application content provided by the application within a three-dimensional (3D) environment, wherein the first set of views are provided from a first set of viewpoints in the 3D environment, during the execution of the application, generating a recording of the execution of the application based on recording program state information and changes to the application content that are determined based on user interactions, and presenting a second set of views including a playback of the application content within the 3D environment based on the recording, wherein the second set of views are provided from a second set of viewpoints that are different than the first set of viewpoints.

These and other embodiments can each optionally include one or more of the following features.

In some aspects, during execution of the application, communications between the application and a system process include the changes to the application content, wherein the second set of views are generated based on the communications.

In some aspects, generating the recording includes obtaining the recorded program state information that corresponds to states of the application content at a plurality of points in time, obtaining the changes to the application content, wherein the changes include changes in the application content occurring between the states, and generating the recording of the execution of the application based on the recorded program state information and the changes to the application content from the communications between the application and the system process.

In some aspects, the application content includes an object and the changes include a delta value for change of a position of the object.

In some aspects, the method further includes receiving input selecting a point in time during the execution of the application as a starting point of the playback.

In some aspects, presenting the playback includes presenting a graphical depiction of a head position, a gaze direction, or a hand position of a user that performed the execution of the application.

In some aspects, presenting the playback includes presenting a graphical depiction of a sound source.

In some aspects, presenting the views of the scene includes presenting video pass-through or see-through images of at least a portion of a physical environment, wherein a 3D reconstruction of at least the portion of the physical environment is dynamically generated during execution of the application, and presenting the playback includes presenting the 3D reconstruction.

In some aspects, during execution of the application, an object of the application content is positioned based on a physics engine, and during playback, the object of the application content is positioned based on determining a position of the object based on the program state information and repositioning the object based on the changes.

In some aspects, during execution of the application, the views of the scene are presented on a head-mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2 is a flowchart representation of an exemplary method that records and plays back application content within a three-dimensional (3D) environment in accordance with some implementations.

Figure 1:
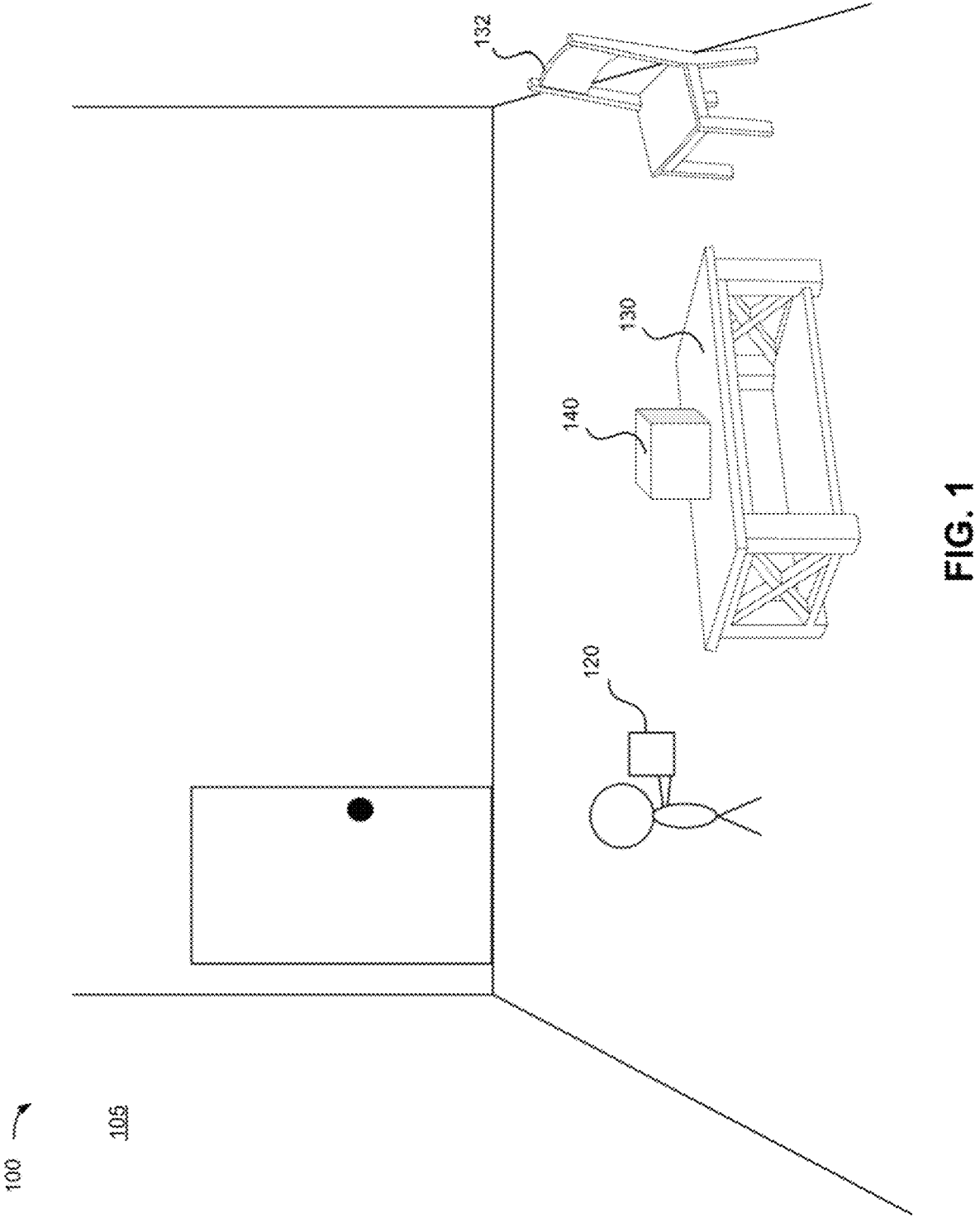
FIG. 1 is an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

FIG. 1 is a block diagram of an example operating environment 100 in accordance with some implementations. In this example, the example operating environment 100 illustrates an example physical environment 105 that includes a table 130, a chair 132, and application content 140 (e.g., a virtual object). While pertinent features are shown, those of ordinary skill in the art will appreciate from the present disclosure that various other features have not been illustrated for the sake of brevity and so as not to obscure more pertinent aspects of the example implementations disclosed herein.

In some implementations, the device 120 is configured to present an environment to the user 102. In some implementations, the device 120 is a handheld electronic device (e.g., a smartphone or a tablet). In some implementations, the user 102 wears the device 120 on his/her head. As such, the device 120 may include one or more displays provided to display content. For example, the device 120 may enclose the field-of-view of the user 102.

In some implementations, the functionalities of device 120 are provided by more than one device. In some implementations, the device 120 communicates with a separate controller or server to manage and coordinate an experience for the user. Such a controller or server may be local or remote relative to the physical environment 105.

According to some implementations, the device 120 may generate and present a computer-generated reality (CGR) environment to their respective users. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create three-dimensional (3D) or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. In some implementations, the image data is pixel-registered with the images of the physical environment 105 (e.g., RGB, depth, and the like) that is utilized with the imaging process techniques within the CGR environment described herein.

Examples of CGR include virtual reality and mixed reality. A virtual reality (VR) environment refers to a simulated environment that is designed to be based entirely on computer-generated sensory inputs for one or more senses. A VR environment includes virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment 105, or a representation thereof. For example, an electronic system for presenting an AR environment may have a transparent or translucent display through which a person may directly view the physical environment 105. The system may be configured to present virtual objects on the transparent or translucent display, so that a person, using the system, perceives the virtual objects superimposed over the physical environment 105. Alternatively, a system may have an opaque display and one or more imaging sensors that capture images or video of the physical environment 105, which are representations of the physical environment 105. The system composites the images or video with virtual objects, and presents the composition on the opaque display. A person, using the system, indirectly views the physical environment 105 by way of the images or video of the physical environment 105, and perceives the virtual objects superimposed over the physical environment 105. As used herein, a video of the physical environment shown on an opaque display is called "pass-through video," meaning a system uses one or more image sensor(s) to capture images of the physical environment 105, and uses those images in presenting the AR environment on the opaque display. Further alternatively, a system may have a projection system that projects virtual objects into the physical environment 105, for example, as a hologram or on a physical surface, so that a person, using the system, perceives the virtual objects superimposed over the physical environment 105.

An augmented reality environment also refers to a simulated environment in which a representation of a physical environment 105 is transformed by computer-generated sensory information. For example, in providing pass-through video, a system may transform one or more sensor images to impose a select perspective (e.g., viewpoint) different than the perspective captured by the imaging sensors. As another example, a representation of a physical environment 105 may be transformed by graphically modifying (e.g., enlarging) portions thereof, such that the modified portion may be representative but not photorealistic versions of the originally captured images. As a further example, a representation of a physical environment 105 may be transformed by graphically eliminating or obfuscating portions thereof.

An augmented virtuality (AV) environment refers to a simulated environment in which a virtual or computer-generated environment incorporates one or more sensory inputs from the physical environment 105. The sensory inputs may be representations of one or more characteristics of the physical environment 105. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment 105.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display.

Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a flowchart representation of an exemplary method 200 that records and plays back application content in a 3D environment (e.g., CGR) in accordance with some implementations. In some implementations, the method 200 is performed by a device (e.g., device 120 of FIG. 1), such as a mobile device, desktop, laptop, or server device. In some implementations, the device has a screen for displaying images and/or a screen for viewing stereoscopic images such as a head-mounted display (HMD). In some implementations, the method 200 is performed by processing logic, including hardware, firmware, software, or a combination thereof. In some implementations, the method 200 is performed by a processor executing code stored in a non-transitory computer-readable medium (e.g., a memory). The content recording and playback process of method 200 is illustrated with reference to FIGS. 3-5.

Figure 3:
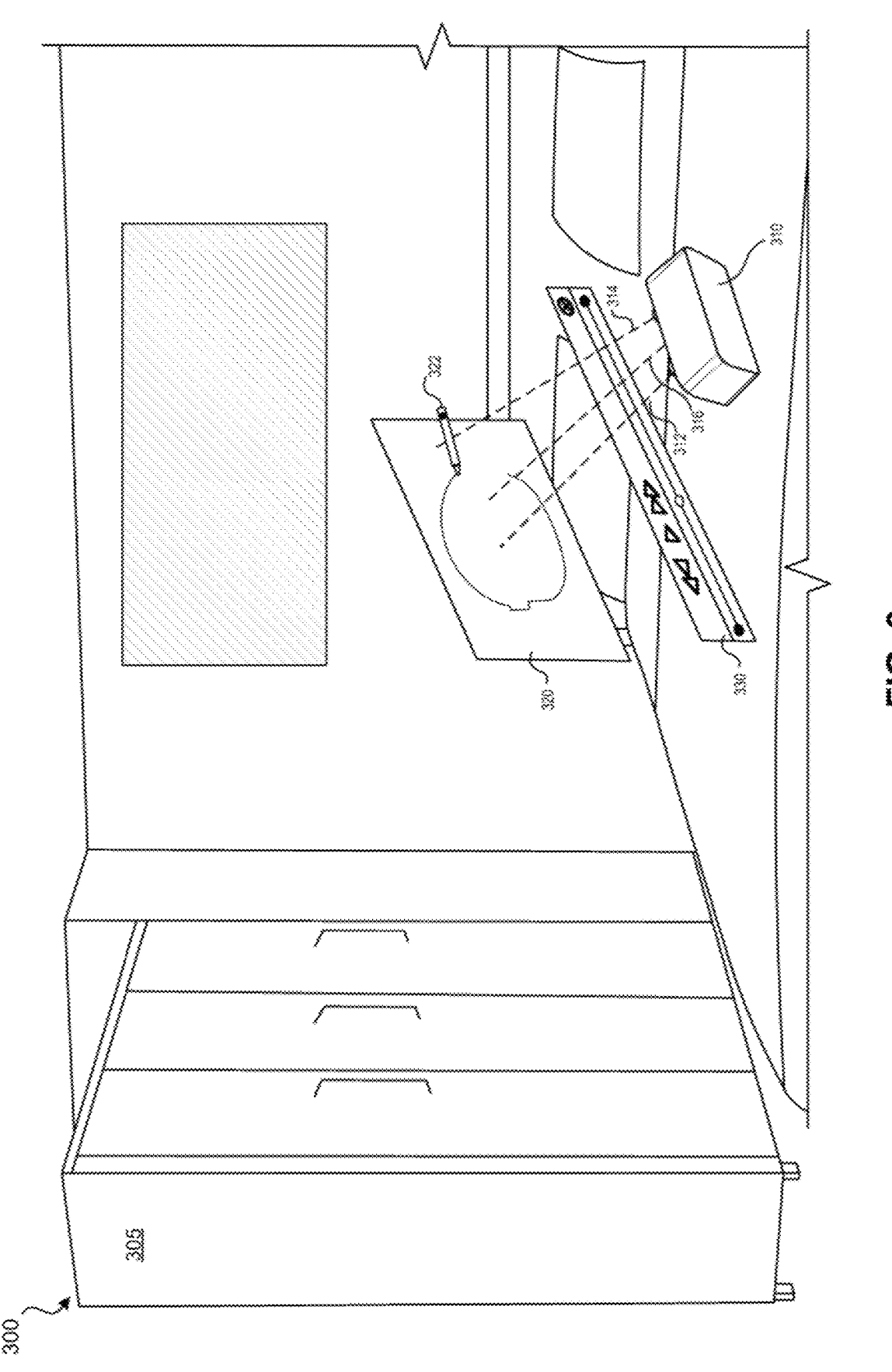
FIG. 3 illustrates an example presentation of a view that includes a snapshot of a playback of application content within a 3D environment in accordance with some implementations.
Figure 4:
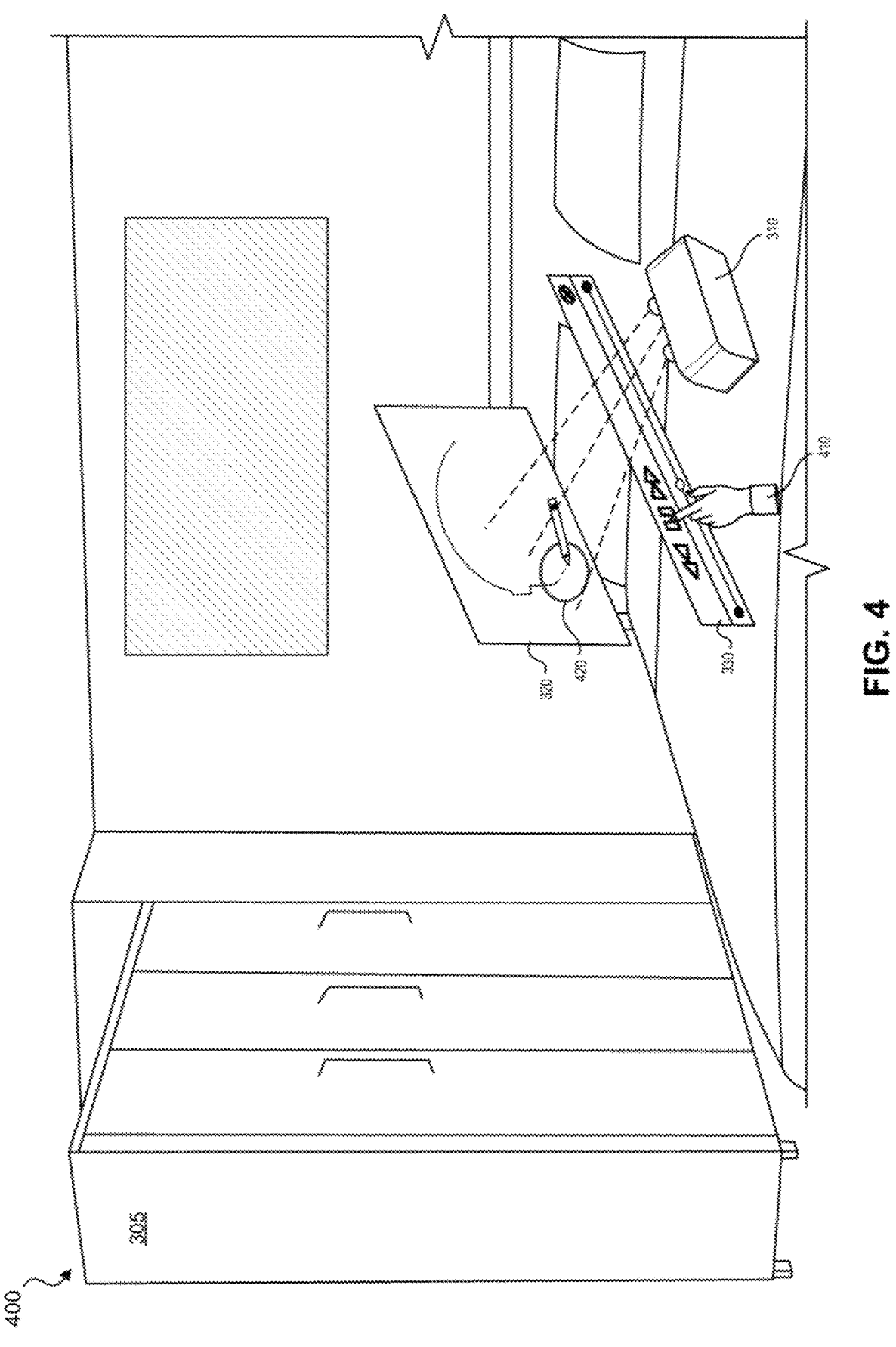
FIG. 4 illustrates an example presentation of a view that includes a snapshot of a playback of application content within a 3D environment in accordance with some implementations.

At block 202, the method 200 presents a first set of views including application content provided by the application within a 3D environment during execution of an application, where the first set of views are provided from a first set of viewpoints in the 3D environment. For example, during testing of an application in a MR environment, a user is executing an application (e.g., a virtual drawing application as illustrated in FIGS. 3-4). The first set of viewpoints may be based on the position of the user's device during execution. In an exemplary implementation, for example, a virtual drawing application may be overlaid on video passthrough, optical see through, or a virtual room. In some implementations, the application may define a virtual bowling ball's weight and the virtual bowling ball may be rolled based on a user hand movement and/or interaction with an input/output (I/O) device. In some implementations, during execution of the application, the views of the scene are presented on a HMD.

At block 204, the method 200 generates a recording of the execution of the application based on recording program state information and changes to the application content that are determined based on user interactions during execution of the application. For example, recording program state information may include recording scene understandings or snapshots, such as locations of objects in the environment. In some implementations, a scene understanding may include head pose data, what the user is looking in the application (e.g., a virtual object), hand pose information. Additionally, recoding a scene understanding may include recording a scene understanding 3D mesh that is concurrently being generating during execution of the program.

In some implementations, a reality engine architecture may synchronize changes between the application and an overall system application. In some implementations, changes and/or deltas communicated between the application and the overall system application may be captured for the recording. Capturing changes and/or deltas communicated between the application and the overall system application can enable recording with little impact on performance of the application. A debugger (e.g., an automatic debugger application or a system engineer who is debugging the application) may receive the app-to-system changes and write them to a video file (e.g., a video file that includes both scene content/snapshot of scene hierarchy and the changes between snapshots).

At block 206, the method 200 presents a second set of views including a playback of the application content within the 3D environment based on the recording. The second set of views are provided from a second set of viewpoints that are different than the first set of viewpoints. Alternatively, the second set of viewpoints are the same viewpoints as the first set of viewpoints (e.g., the debugger has the same view as the user of the application). The second set of viewpoints may be based on the position of the user's device during the playback.

In some implementations, the 3D environment, e.g., the scene and other application content, may be rendered continuously/live throughout the execution and playback. That is the rendering engine can run continuously injecting executing application content during one period of time and recorded application content at another period of time. In some implementations, playback may be different than simply reconstituting the content in the same way it was originally produced. For example, playback may involve using recorded values for a ball's position rather than having the ball use the physics system.

The user (e.g., the programmer/debugger) may pause the test and use a scrubber tool to go back to view a desired point in time. In some implementations, the user may playback from the same viewpoint or, alternatively, the user may change the viewpoint and see depictions of where the HMD was, such as based on the gaze direction. In some implementations, the user may change the viewpoint to observe scene understanding, (e.g., head position, hand position, 3D reconstruction mesh, etc.). In some implementations, a developer may go back to enable display of representations of sound sources (e.g., spatialized audio) and other invisible items. In some implementations, a developer may add data tracks.

In some implementations, the method 200 involves focusing on reusing changes/deltas of the snapshots (e.g., scene understandings) that are already used in an app-to-system reality architecture so that recording can be done efficiently and accurately with little impact on performance. In an exemplary implementation, during execution of the application, communications between the application and a system process (e.g., the debugger/system application) include the changes to the application content, wherein the second set of views are generated based on the communications. For example, the system application (e.g., the debugger application) is responsible for a system process. The system process may include rendering, presenting the different fields of view, etc. This exemplary implementation presents a reality engine architecture in which changes between an application and a system application are synchronized. For example, the system application may display content/changes provided by multiple applications. In some implementations, the system application may provide environment content (e.g., walls, floors, system functionality, etc.) and application content within in it in an environment in which the user (e.g., a debugger or programmer) can interact with both the system application elements and the application elements.

In some implementations, generating the recording includes obtaining the recorded program state information that corresponds to states of the application content at a plurality of points in time (e.g., the debugger application obtaining periodic snapshots), obtaining the changes to the application content, and generating the recording of the execution of the application based on the recorded program state information and the changes to the application content from the communications between the application and the system process. The changes may include changes in the application content occurring between the states. For example, the changes may include changes to parameters, increases/decreases, positional changes, new values, new positions (of the user's head pose, hand pose, and the like), etc., that changed between each snapshot.

In some implementations, the method 200 further involves receiving input selecting a point in time during the execution of the application as a starting point of the playback. For example, a scrubber tool may be used to pause and go back to an earlier point in time. In some implementations, the application content includes an object and the changes include a delta value for change of a position of the object.

In some implementations, presenting the playback includes presenting a graphical depiction of a head position, a gaze direction, and/or a hand position of a user that performed the execution of the application. In some implementations, presenting the playback includes presenting a graphical depiction of a sound source. For example, for spatialized audio, a sound icon may be used to show the programmer where the spatialized sound source was located at that particular time during the playback.

In some implementations, presenting the views of the scene includes presenting video pass-through or see-through images of at least a portion of a physical environment, and presenting the playback includes presenting the 3D reconstruction. In some implementations, a 3D reconstruction of at least the portion of the physical environment is dynamically generated during execution of the application. For example, this allows a developer to see that an error in an application was caused because the 3D reconstruction was incomplete at that point in time.

In some implementations, the method 200 involves playback differing based on the use (e.g., execution). That is, focusing on using recorded positions rather than a physics engine to determine positions of the user at a particular point during the playback. In an exemplary implementation, during execution of the application, an object of the application content is positioned based on a physics engine; and during playback, the object of the application content is positioned based on determining a position of the object based on the program state information and repositioning the object based on the changes.

Figure 5:
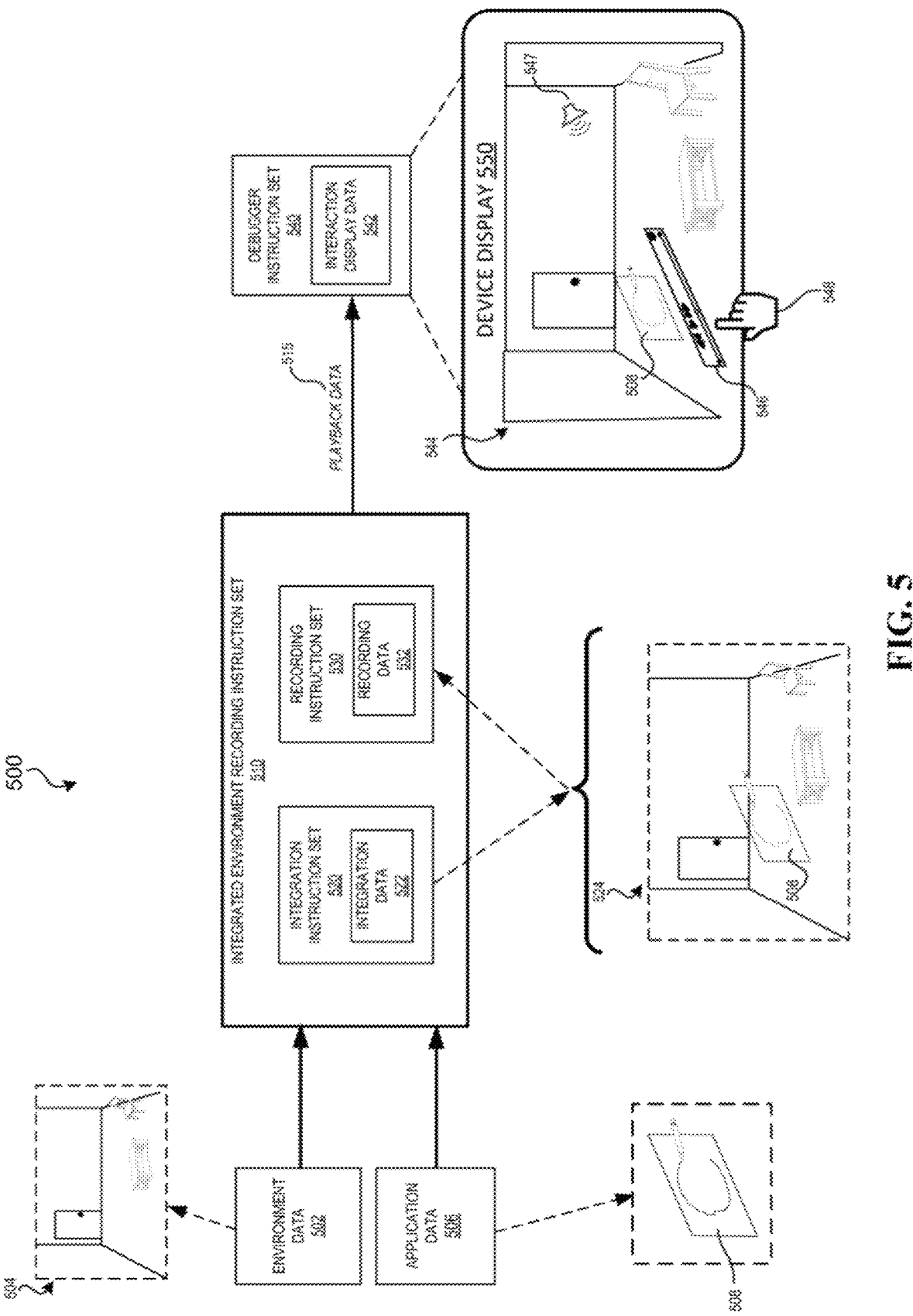
FIG. 5 illustrates an example presentation of a view that includes a snapshot of a playback of application content within a 3D environment in accordance with some implementations.

The presentation of a second set of views including a playback of the application content within the 3D environment based on the recording, wherein the second set of views are provided from a second set of viewpoints (e.g., based on the position of the user's device during the playback) that are different than the first set of viewpoints is further described herein with reference to FIGS. 3-5. In particular, FIGS. 3 and 4 illustrate examples of views presented to a programmer (e.g., a debugger) watching a playback/recording of a user interacting with an application (e.g. virtual application overlaid on a physical environment, i.e., pass through video). FIG. 5 illustrates a system flow diagram that illustrates playback of the application content within the 3D environment based on the recording in accordance with techniques described herein.

FIG. 3 illustrates an example environment 300 presenting a snapshot representation of a physical environment (e.g., pass through video), presenting a user's viewpoint of an application program 320 (e.g., a virtual drawing application) from a different viewpoint (e.g., a debugger's viewpoint). The application program 320 includes a drawing tool 322. The different viewpoint is from a debugger's view, and the debugger is presented with a scrubber tool 330 (e.g., a virtual playback controller) for the debugger at a point in time in accordance with some implementations.

As used herein, a "user" is a person using the application program 320 (e.g., a virtual drawing application), and a "debugger" is a person using a system application, using the techniques described herein, to playback (from another viewpoint as shown, or, alternatively from the same viewpoint) the application program 320 to a snapshot of a particular point in time. The user and debugger may be the same person of different persons. Thus, for example, FIG. 3 illustrates a debugger's perspective of watching a user's perspective via a device 310 (e.g., an HMD) of a virtual application (e.g., application program 320) that is overlaid or placed within a 3D representation of real-world content (e.g., pass-through video of the user's bedroom) of a physical environment 305.

As illustrated in FIG. 3, the device 310 (e.g., device 120 of FIG. 1) illustrates the head pose and gaze direction of the user. For example, a left eye gaze 312 and a right eye gaze 314 are detected by the device 310 (e.g., using internal facing cameras, computer vision, etc.), and are shown within the debugger application such that debugger can determine what the user's gaze was focused on at the time of the snapshot of the playback. For example, some virtual applications utilize a person's gaze in order provide additional functionality for the particular program being utilized (e.g., application program 320). The centerline gaze 316 indicates the head pose of the user. In some implementations, the centerline gaze 316 may include an averaged gaze direction for the user based on the left eye gaze 312 and the right eye gaze 314. Additionally, or alternatively, the centerline gaze 316 may be based on a sensor in the device 310, such as an inertial measurement unit (IMU), an accelerometer, a magnetometer, a gyroscope, or the like.

In some implementations, the debugger's viewpoint may be illustrated as the same as the user's viewpoint, or maybe illustrated from a different viewpoint. Thus, the views presented to a debugger may illustrate a user during execution of the application program 320. During execution of the application program 320, a system application (e.g., a debugger application) is recording program state information and changes to the application content that are determined based on user interactions during execution of the application. For example, recording program state information may include recording scene understandings or snapshots, such as locations of objects in the environment (e.g., virtual objects within the application program 320). In some implementations, a scene understanding may include head pose data, what the user is looking in the application (e.g., a virtual object), hand pose information. Additionally, recoding a scene understanding mesh may include recording scene understanding 3D mesh that is concurrently being generating during execution of the program.

Additionally, recoding a scene understanding may include recording other data other than visual data. For example, spatialized audio may be part of the application program 320. Thus, the system application can playback the spatialized audio that is produced by the application program 320. In some implementations, a visual element (e.g., a virtual icon) may be presented on the debugger viewpoint to indicate the location (e.g., the 3D coordinates) of where the spatialized audio is coming from at that moment in time during the playback.

In some implementations, a reality engine architecture may synchronize changes between the application (e.g., application program 320) and an overall system application (e.g., a debugger's application). In some implementations, changes and/or deltas communicated between the application and the overall system application may be captured for the recording. Capturing changes and/or deltas communicated between the application and the overall system application can enable recording with little impact on performance of the application. A debugger (e.g., an automatic debugger application or a system engineer who is debugging the application) may receive the app-to-system changes and write them to a video file (e.g., a video file that includes both scene content/snapshot of scene hierarchy and the changes between snapshots).

In some implementations, the 3D environment, e.g., the scene and other application content, may be rendered continuously/live throughout the execution and playback via a scrubber tool 330. That is the rendering engine can run continuously injecting executing application content during one period of time and recorded application content at another period of time. In some implementations, playback may be different than simply reconstituting the content in the same way it was originally produced. For example, playback may involve using recorded values for a ball's position (e.g., 3D coordinates) rather than having the ball use the physics system (e.g., in a virtual bowling application). That is the user (e.g., the programmer/debugger) may pause the test and use a scrubber tool 330 to go back to view a desired point in time (e.g., to view a debugging event/error that occurred as further discussed herein with reference to FIG. 4).

In some implementations, generating the recording includes obtaining the recorded program state information that corresponds to states of the application content at a plurality of points in time (e.g., the debugger application obtaining periodic snapshots), obtaining the changes to the application content, and generating the recording of the execution of the application based on the recorded program state information and the changes to the application content from the communications between the application and the system process. The changes may include changes in the application content occurring between the states. For example, the changes may include changes to parameters, increases/decreases, positional changes, new values, new positions (of the user's head pose, hand pose, and the like), etc., that changed between each snapshot.

FIG. 4 illustrates an example environment 400 presenting a representation of a snapshot of a physical environment (e.g. pass through video), presenting a user's viewpoint of an application (e.g., a virtual drawing application) from a different viewpoint (e.g., a debugger's viewpoint), and presenting a scrubber tool (e.g., a virtual playback controller) for the debugger at particular point in time (e.g., during a debugging event, such as an error) in accordance with some implementations. Thus, for example, FIG. 4 illustrates a debugger's perspective of watching a user's perspective of a virtual application (e.g., application program 320) that is overlaid or placed within a representation of real-world content (e.g., pass-through video of the user's bedroom). However, FIG. 4 illustrates the debugger pausing the playback of the application execution at a particular time (e.g., when a debugging event occurs). For example, at a particular time, a debugging event 420 (e.g., a "glitch") occurs during the execution of the application program 320. The debugger can then use the scrubber tool 330 via the system application (e.g., a debugger application) to playback a recording of the execution of the application program 320 and stop the playback at any particular time. The hand icon 410 is a 3D representation of the hand of the debugger in the system environment as the debugger interacts with the scrubber tool 330 (e.g., hits the pause button when the debugging event 420 occurs).

In some implementations, the debugger has an opportunity to view the playback from different viewpoints. For example, the debugger can utilize the system application and hand icon 410 to grab the current snapshot and drag the perspective for the debugger. For example, environment 400 illustrates a particular viewpoint for the debugger from a particular 3D coordinate (e.g., x1, y1, z1). In some implementations, the debugger can utilize the hand icon 410 (e.g., a selectable icon), or other means, and change the viewpoint at that same particular snapshot in time (e.g., during the debugging event 420) to view the snapshot from a different 3D coordinate (e.g., x2, y2, z2). In some implementations, the debugger can move device 310 to exemplary location x2, y2, z2 and responsive to this movement, device updates the view of the snapshot.

FIG. 5 illustrates a system flow diagram of an example environment 500 in which a system can present a view that includes a snapshot of a playback of application content within a 3D environment according to some implementations. In some implementations, the system flow of the example environment 500 is performed on a device (e.g., device 120 of FIG. 1), such as a mobile device, desktop, laptop, or server device. The images of the example environment 500 can be displayed on the device that has a screen for displaying images and/or a screen for viewing stereoscopic images such as a HMD. In some implementations, the system flow of the example environment 500 is performed on processing logic, including hardware, firmware, software, or a combination thereof. In some implementations, the system flow of the example environment 500 is performed on a processor executing code stored in a non-transitory computer-readable medium (e.g., a memory).

The system flow of the example environment 500 acquires environment data 502 (e.g., image data) from sensors of a physical environment (e.g., the physical environment 105 of FIG. 1), and acquires application data 506 from an application program (e.g., application program 320 of FIGS. 3-4), integrates and records the environment data 502 and the application data 506, and generates interactive playback data for a debugger to view execution of the application program (e.g., to identify an occurrence of an error (if any)). For example, a virtual application debugger technique described herein can playback execution of an application from different viewpoints by recording program state information that corresponds to states of the application content at a plurality of points in time (e.g., the debugger application obtaining periodic snapshots), obtain the changes to the application content, and generate the recording of the execution of the application based on the recorded program state information and the changes to the application content from the communications between the application and the system process.

In an example implementation, the environment 500 includes an image composition pipeline that acquires or obtains data (e.g., image data from image source(s)) of the physical environment from a sensor on a device (e.g., device 120 of FIG. 1). Example environment 500 is an example of acquiring image sensor data (e.g., light intensity data, depth data, and position information) for a plurality of image frames. For example, image 504 represents a user acquiring image data as the user is in a room in a physical environment (e.g., the physical environment 105 of FIG. 1). The image source(s) may include a depth camera that acquires depth data of the physical environment, a light intensity camera (e.g., RGB camera) that acquires light intensity image data (e.g., a sequence of RGB image frames), and position sensors to acquire positioning information. For the positioning information, some implementations include a visual inertial odometry (VIO) system to determine equivalent odometry information using sequential camera images (e.g., light intensity data) to estimate the distance traveled. Alternatively, some implementations of the present disclosure may include a SLAM system (e.g., position sensors). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In the example implementation, the environment 500 includes an application data pipeline that acquires or obtains application data (e.g., application data from application program source(s)). For example, the application data may include a virtual drawing application 508 (e.g., virtual application 320 of FIGS. 3-4). The application data may include 3D content (e.g., virtual objects) and user interaction data (e.g., haptic feedback of user interactions with the application).

In an example implementation, the environment 500 includes an integrated environment recording instruction set 510 that is configured with instructions executable by a processor to generate playback data 515. For example, the integrated environment recording instruction set 510 obtains environment data 502 (e.g., image data of a physical environment such as the physical environment 105 of FIG. 1), obtains application data (e.g., a virtual application), integrates the environment data and application data (e.g., overlays the virtual application onto a 3D representation of the physical environment), records the state changes and scene understanding during execution of the application, and generates playback data 515.

In an example implementation, the integrated environment recording instruction set 510 includes an integration instruction set 520 and a recording instruction set 530. The integration instruction set 520 is configured with instructions executable by a processor to integrate the image data of the physical environment and application data from a virtual application to overlay the virtual application onto a 3D representation of the physical environment. For example, the integration instruction set 520 analyzes the environment data 502 to generate a 3D representation (video passthrough, optical see through, or a reconstructed virtual room) of the physical environment and integrates the application data with the 3D representation so that a user, during execution of the application, views the application as an overlay on top of the 3D representation, as illustrated herein with reference to FIGS. 3-4.

The recording instruction set 520 is configured with instructions executable by a processor to acquire the integration data 522 from the integration instruction set 520 and generate recording data 532. For example, the recording instruction set 520 generates a recording of the execution of the application based on recording program state information and changes to the application content that are determined based on user interactions during execution of the application. For example, recording program state information may include recording scene understandings or snapshots, such as locations of objects in the environment. In some implementations, a scene understanding may include head pose data, what the user is looking in the application (e.g., a virtual object), hand pose information, and the like. Additionally, recording program state information may include recording a scene understanding mesh. The scene understanding mesh may include a 3D mesh that is concurrently being generating during execution of the program.

In some implementations, the environment 500 includes a debugger instruction set 540 that is configured with instructions executable by a processor to assess the playback data 422 from the integrated environment recording instruction set 510 presents a set of views (e.g., either from the same perspective, or from a different perspective than the application data) including a playback of the application content within the 3D environment based on the recording data 532. In some implementations, the second set of views (e.g., from a different perspective/viewpoint than a user as illustrated in FIGS. 3-4), is displayed on the device display 550 of the device (e.g., device 120 of FIG. 1). In some implementations, debugger instruction set 540 generates interaction display data 542, such as a scrubber tool 546 (e.g., scrubber tool 330 of FIGS. 3-4), so that a debugger and interact with playback data (e.g., rewind, change perspective, and the like).

In some implementations, the generated 3D environment 544, e.g., the scene and other application content, may be rendered continuously/live throughout the execution and playback. That is the rendering engine can run continuously injecting executing application content during one period of time and recorded application content at another period of time. In some implementations, playback may be different than simply reconstituting the content in the same way it was originally produced. For example, playback may involve using recorded values for a ball's position rather than having the ball use the physics system. That is the user (e.g., the programmer/debugger) may pause the test and use a scrubber tool to go back to view a desired point in time. In some implementations, the user may playback from the same viewpoint or, alternatively, the user may change the viewpoint and see depictions of where the HMD was, such as based on the gaze direction. In some implementations, the user may change the viewpoint to observe scene understanding, (e.g., head position, hand position, 3D reconstruction mesh, etc.).

In some implementations, a developer may go back to enable display of representations of sound sources (e.g., spatialized audio) and other invisible items. For example, an icon 547 may be presented to the debugger when the application data is paused via the scrubber tool 546. For example, icon 547 represents a 3D location of the source of the sound being presented to the user at that time the application data is "paused." The visual representation via icon 547 can help the debugger better determine the location of the spatialized audio in case the debugging event that occurred also included a sound that is in the incorrect 3D location of the application data.

In some implementations, the integrated environment recording instruction set 510 and the debugger instruction set 540 involves focusing on reusing changes/deltas of the snapshots (e.g., scene understandings) that are already used in an app-to-system reality architecture so that recording can be done efficiently and accurately with little impact on performance. In an exemplary implementation, during execution of the application, communications between the application and a system process (e.g., the debugger/system application) include the changes to the application content, wherein the second set of views are generated based on the communications. For example, the system application (e.g., the debugger application) is responsible for a system process. The system process may include rendering, presenting the different fields of view, etc. This exemplary implementation presents a reality engine architecture in which changes between an application and a system application are synchronized. For example, the system application may display content/changes provided by multiple applications. In some implementations, the system application may provide environment content (e.g., walls, floors, system functionality, etc.) and application content within in it in an environment in which the user (e.g., a debugger or programmer) can interact with both the system application elements and the application elements.

Figure 6:
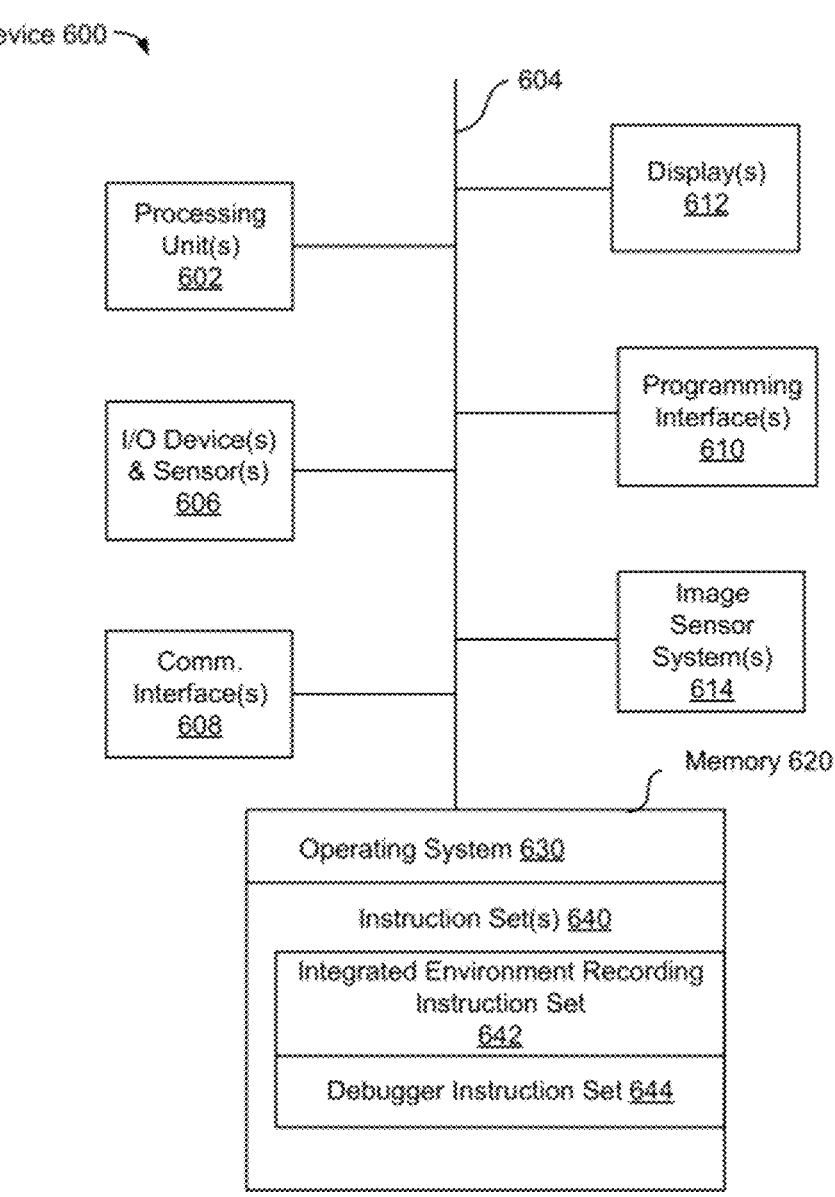
FIG. 6 is an example device in accordance with some implementations.

FIG. 6 is a block diagram of an example device 600. Device 600 illustrates an exemplary device configuration for device 120 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing units 602 (e.g., microprocessors, ASICs, FPGAs, GPUs, CPUs, processing cores, and/or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 610, one or more displays 612, one or more interior and/or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 612 are configured to present a view of a physical environment or a graphical environment to the user. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 612 correspond to diffractive, reflective, polarized, holographic, etc. waveguide displays. In one example, the device 600 includes a single display. In another example, the device 600 includes a display for each eye of the user.

In some implementations, the one or more image sensor systems 614 are configured to obtain image data that corresponds to at least a portion of the physical environment 105. For example, the one or more image sensor systems 614 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 614 further include illumination sources that emit light, such as a flash. In various implementations, the one or more image sensor systems 614 further include an on-camera image signal processor (ISP) configured to execute a plurality of processing operations on the image data.

In some implementations, the device 120 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 10 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 120.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 includes a non-transitory computer readable storage medium.

In some implementations, the memory 620 or the non-transitory computer readable storage medium of the memory 620 stores an optional operating system 330 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing units 602 to carry out one or more of the techniques described herein.

The instruction set(s) 640 include an integrated environment instruction set 642 and a debugger instruction set 644. The instruction set(s) 640 may be embodied as a single software executable or multiple software executables.

The integrated environment instruction set 642 (e.g., point cloud registration instruction set 320 of FIG. 3) is executable by the processing unit(s) 602 to generate playback data 515. For example, the integrated environment recording instruction set 642 obtains environment data (e.g., image data of a physical environment such as the physical environment 105 of FIG. 1), obtains application data (e.g., a virtual application), integrates the environment data and application data (e.g., overlays the virtual application onto a 3D representation of the physical environment), records the state changes and scene understanding during execution of the application, and generates playback data. In an example implementation, the integrated environment recording instruction set includes an integration instruction set and a recording instruction set. The integration instruction set is configured with instructions executable by a processor to integrate the image data of the physical environment and application data from a virtual application to overlay the virtual application onto a 3D representation of the physical environment. For example, the integration instruction set analyzes the environment data to generate a 3D representation (video pass-through, optical see through, or a reconstructed virtual room) of the physical environment and integrates the application data with the 3D representation so that a user, during execution of the application, views the application as an overlay on top of the 3D representation, as illustrated herein with reference to FIGS. 3-4.

The debugger instruction set 644 is configured with instructions executable by a processor to assess the playback data from the integrated environment instruction set 642 and presents a set of views including a playback of the application content within the 3D environment based on the playback data. In some implementations, the second set of views (e.g., from a different perspective/viewpoint than a user as illustrated in FIGS. 3-4), is displayed on a display of a device (e.g., device 120 of FIG. 1). In some implementations, debugger instruction set 540 generates interaction display data, such as a scrubber tool (e.g., scrubber tool 330 of FIGS. 3-4), so that a debugger and interact with playback data (e.g., rewind, change perspective, and the like).

Although the instruction set(s) 640 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Some implementations disclosed herein provide techniques that integrate information (e.g., partial point clouds) from an arbitrary number of images of a scene captured from arbitrary views (e.g. viewpoint-1 102a and viewpoint-2 102b). In some implementations, techniques disclosed herein are used to estimate transform parameters for the partial point clouds using two or more images, e.g., images captured by a mobile device, HMD, laptop, or other device (e.g., device 120) captured from two different points of view. The techniques may utilize machine learning models including deep learning models that inputs two partial point clouds and directly predicts the point-wise location of one point cloud in the other's coordinate system without explicit matching. Deep learning may be applied to each of partial point clouds to generate a latent representation of the estimated transform parameters. In some implementations, a deep learning model generates an associated confidence level for each of the latent values. Using the predictions and confidence values from the different images, the techniques can combine the results to produce a single estimate of each of the transform parameters for the partial point clouds.

Several details are described in order to provide a thorough understanding of the example aspects as shown in the drawings. Moreover, the drawings merely show some example aspects of the present disclosure and are therefore not to be considered limiting. Those of ordinary skill in the art will appreciate that well-known systems, methods, components, devices and circuits have not been described in exhaustive detail so as not to obscure more pertinent aspects of the example implementations described herein. Moreover, other effective aspects and/or variants do not include all of the specific details described herein.

Aspects of the methods disclosed herein may be performed in the operation of computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A non-transitory computer-readable storage medium, storing program instructions executable by one or more processors to perform operations comprising:

during execution of an application, presenting a first set of views comprising application content provided by the application within a three-dimensional (3D) environment, wherein the first set of views are provided from a first set of viewpoints in the 3D environment;

recording program state information that corresponds to the execution of the application content at a plurality of points in time, wherein recording the program state information comprises recording a scene understanding associated with the 3D environment, the scene understanding comprising positions and properties of objects within the 3D environment and pose data associated with a head or a hand of a user;

recording changes to the application content that are determined based on user interactions that comprise user actions and responses to the user actions, the responses specified by a configuration of the executing application;

obtaining debugger/system-process communications between the application and a system process that comprises the changes to the application content, wherein the debugger/system-process communications comprise information associated with execution-time changes associated with the executing application in the 3D environment; and generating a recording of the execution of the application based on the recording of the program state information, the recording of the changes to the application content, and the debugger/system-process communications between the application and the system process; and after execution of the application, presenting a second set of views comprising a playback of the application content within the 3D environment based on the recording of the program state information, the recording of the changes to the application content, and the debugger/system-process communications between the application and the system process, wherein the second set of views are generated based on the debugger/system-process communications between the application and the system process for the plurality of points in time, and wherein the second set of views are provided from a second set of viewpoints that are different than the first set of viewpoints.

2. The non-transitory computer-readable storage medium of claim 1, wherein generating the recording of the execution of the application based on the program state information and the recording of the changes to the application content comprises:

obtaining the recorded program state information that corresponds to states of the application content at a plurality of points in time;

obtaining the changes to the application content, wherein the changes comprise changes in the application content occurring between the states; and generating the recording of the execution of the application based on the recorded program state information and the changes to the application content from the communications between the application and the system process for the plurality of points in time.

3. The non-transitory computer-readable storage medium of claim 1, wherein the application content comprises an object and the changes comprise a delta value for change of a position of the object.

4. The non-transitory computer-readable storage medium of claim 1, wherein the operations further comprise receiving input selecting a point in time during the execution of the application as a starting point of the playback.

5. The non-transitory computer-readable storage medium of claim 1, wherein presenting the playback comprises presenting a graphical depiction of a head position, a gaze direction, or a hand position of a user that performed the execution of the application.

6. The non-transitory computer-readable storage medium of claim 1, wherein presenting the playback comprises presenting a graphical depiction of a sound source.

7. The non-transitory computer-readable storage medium of claim 1, wherein:

presenting the first set of views or the second set of views comprises presenting video pass-through or see-through images of at least a portion of a physical environment, wherein a 3D reconstruction of at least the portion of the physical environment is dynamically generated during execution of the application; and presenting the playback comprises presenting the 3D reconstruction.

8. The non-transitory computer-readable storage medium of claim 1, wherein, during execution of the application, an object of the application content is positioned based on a physics engine; and during playback, the object of the application content is positioned based on determining a position of the object based on the program state information and repositioning the object based on the changes.

9. The non-transitory computer-readable storage medium of claim 1, wherein, during execution of the application, the first set of views or the second set of views are presented on a head-mounted device (HMD).

10. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

during execution of an application, presenting a first set of views comprising application content provided by the application within a three-dimensional (3D) environment, wherein the first set of views are provided from a first set of viewpoints in the 3D environment;

recording program state information that corresponds to the execution of the application content at a plurality of points in time, the program state information comprising positions and properties of objects within the 3D environment and information associated with user interactions within the 3D environment;

recording changes to the application content that are determined based on user interactions that comprise user actions and responses to the user actions, the responses specified by a configuration of the executing application;

obtaining debugger/system-process communications between the application and a system process that comprises the changes to the application content, wherein the debugger/system-process communications comprise information associated with execution-time changes associated with the executing application in the 3D environment; and generating a recording of the execution of the application based on the recording of the program state information, the recording of the changes to the application content, and the debugger/system-process communications between the application and the system process; and after execution of the application, presenting a second set of views comprising a playback of the application content within the 3D environment based on the recording of the program state information, the recording of the changes to the application content, and the debugger/system-process communications between the application and the system process, wherein the second set of views are generated based on the debugger/system-process communications between the application and the system process for the plurality of points in time, and wherein the second set of views are provided from a second set of viewpoints that are different than the first set of viewpoints.

11. The device of claim 10, wherein generating the recording of the execution of the application based on the program state information and the recording of the changes to the application content comprises:

obtaining the recorded program state information that corresponds to states of the application content at a plurality of points in time;

obtaining the changes to the application content, wherein the changes comprise changes in the application content occurring between the states; and generating the recording of the execution of the application based on the recorded program state information and the changes to the application content from the communications between the application and the system process for the plurality of points in time.

12. The device of claim 10, wherein the operations further comprise receiving input selecting a point in time during the execution of the application as a starting point of the playback.

13. The device of claim 10, wherein presenting the playback comprises presenting a graphical depiction of a head position, a gaze direction, or a hand position of a user that performed the execution of the application.

14. The device of claim 10, wherein the application content comprises an object and the changes comprise a delta value for change of a position of the object.

15. The device of claim 10, wherein presenting the playback comprises presenting a graphical depiction of a sound source.

16. The device of claim 10, wherein:

presenting the first set of views or the second set of views comprises presenting video pass-through or see-through images of at least a portion of a physical environment, wherein a 3D reconstruction of at least the portion of the physical environment is dynamically generated during execution of the application; and presenting the playback comprises presenting the 3D reconstruction.

17. The device of claim 10, wherein during execution of the application, an object of the application content is positioned based on a physics engine; and during playback, the object of the application content is positioned based on determining a position of the object based on the program state information and repositioning the object based on the changes.

18. A method comprising:

at an electronic device having a processor:

during execution of an application, presenting a first set of views comprising application content provided by the application within a three-dimensional (3D) environment, wherein the first set of views are provided from a first set of viewpoints in the 3D environment;

recording program state information that corresponds to the execution of the application content at a plurality of points in time, the program state information comprising positions and properties of objects within the 3D environment and information associated with user interactions within the 3D environment;

recording changes to the application content that are determined based on user interactions that comprise user actions and responses to the user actions, the responses specified by a configuration of the executing application;

obtaining debugger/system-process communications between the application and a system process that comprises the changes to the application content, wherein the debugger/system-process communications comprise information associated with execution-time changes associated with the executing application in the 3D environment; and generating a recording of the execution of the application based on the recording of the program state information, the recording of the changes to the application content, and the debugger/system-process communications between the application and the system process; and after execution of the application, presenting a second set of views comprising a playback of the application content within the 3D environment based on the recording of the program state information, the recording of the changes to the application content, and the debugger/system-process communications between the application and the system process, wherein the second set of views are generated based on the debugger/system-process communications between the application and the system process for the plurality of points in time, and wherein the second set of views are provided from a second set of viewpoints that are different than the first set of viewpoints.

* * * * *